July 26, 1932. S. HUGHES ET AL 1,869,214
PROCESS OF RECOVERING THALLIUM
Original Filed July 29, 1927
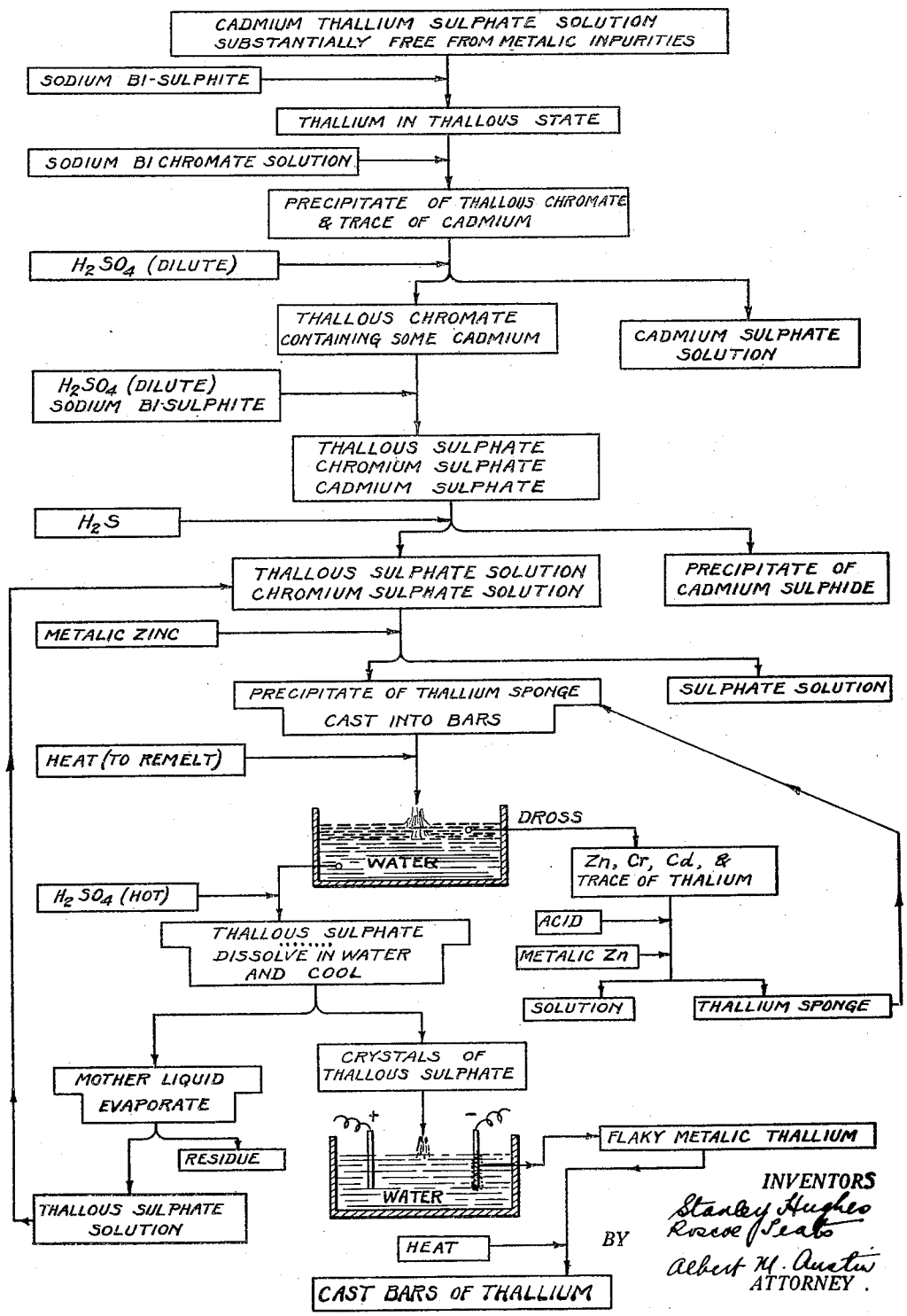

Patented July 26, 1932

1,869,214

UNITED STATES PATENT OFFICE

STANLEY HUGHES AND ROSCOE TEATS, OF DENVER, COLORADO, ASSIGNORS TO AMERICAN SMELTING AND REFINING COMPANY, OF NEW YORK, N. Y., A CORPORATION OF NEW JERSEY

PROCESS OF RECOVERING THALLIUM

Application filed July 29, 1927, Serial No. 209,386. Renewed January 23, 1932.

This invention relates to the separation and recovery of thallium from mixtures of thallium and various other metals and more particularly, to the recovery of thallium from the cadmium sulphate solution which is utilized in the manufacture of cadmium.

In the process of recovering cadmium in which the various elements are converted into sulphates, a solution of cadmium and thallium sulphate is obtained which is substantially free from such impurities as copper, silver, bismuth, lead, mercury, arsenic and iron. Various methods may be employed for eliminating the above mentioned impurities such as the process shown in the co-pending application of Roscoe Teats Serial No. 100,044. The particular method employed however, forms no part of the present invention and will not be described in detail herein.

In order to recover thallium from the cadmium thallium solutions it is necessary to precipitate the thallium from the solutions and separate the thallium from the entrained cadmium which in accordance with the present invention is accomplished with a plurality of steps including precipitation, melting and crystallization, as will be described in detail hereinafter.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself as to its objects and advantages, the mode of its operation and the manner of its organization may be better understood by referring to the following description in which a particular commercial embodiment thereof is disclosed. It will be understood however, that the processes and the steps thereof may be modified in various respects without departing from the broad spirit and scope of the invention.

In the drawing accompanying and forming a part of this application, the figure is a flow sheet of a process of recovering thallium in accordance with the present invention.

In the following description and in the claims the various steps in the process and the details comprising the invention will be identified by specific names for convenience but they are intended to be as generic in their application as the art will permit.

One method of practicing the present invention comprises utilizing the cadmium thallium sulphate solution obtained during the manufacture of cadmium which has been freed from various metallic impurities and reducing the thallium therein to the thallous state. This is accomplished by adding sodium bi-sulphite to the solution and thoroughly mixing the same by stirring or other suitable means.

After the thallium has been reduced to the thallous state it is precipitated by adding a solution of sodium bi-chromate or sodium chromate in water until the thallous is completely precipitated as thallium chromate. This substance being a heavy solid readily settles to the bottom of the container and may be recovered by decantation of the cadmium sulphate solution.

Although the thallium has been substantially completely removed from the cadmium solution by the above step, the thallium chromate precipitate contains considerable quantities of cadmium which must be separated therefrom. A large portion of the remaining cadmium may be removed by digesting the thallium chromate with dilute sulphuric acid which dissolves the cadmium. The residue composed largely of thallium chromate may then be separated from the cadmium solution by filtration or decantation.

The thallium in the thallium chromate residue is converted to a thallous sulphate by agitating with dilute sulphuric acid and sodium bi-sulphite. The sodium bi-sulphite reduces the chromium present as chromate to chromium sulphate, and the thallium is converted to thallous sulphate. The conjoint action of the sulphuric acid and the sodium bi-sulphite gives rise to gaseous sulphur dioxide, which being generated in situ, is uniformly dispersed throughout the solution, and in its highly reactive nascent condition, facilitates and accelerates the foregoing reactions. Further quantities of cadmium are then precipitated from the thallous sulphate solution by passing hydrogen sulphide therethrough for converting the cadmium to cadmium sulphide. This substance may then be removed by decantation or filtration. While hydrogen sulphide has been given as a sulphide reagent which is adapted to selectively convert the cadmium values to cadmium sulphide, it will, of course, be appreciated that any other soluble sulphide which is adapted to selectively react with cadmium values to form cadmium sulphide may be used.

The filtrate containing thallium sulphate and chromium sulphate may then be treated with metallic zinc which displaces the thallium in the solution and causes the same to precipitate in the metallic state in the form known as "thallium sponge" which is then pressed into a firm cake, melted and cast into bars of thallium.

The thallium bars may then be remelted and granulated thallium obtained by pouring the molten metal into water. The molten metal may contain small amounts of zinc, chromium and cadmium which will largely go into the dross and may be removed. A double melting may be employed to more completely eliminate these elements.

The dross formed in the melting operations is removed, dissolved in acid and the thallium contained therein is again converted to a metallic sponge by the use of zinc.

The granulated thallium metal may be converted into thallous sulphate by treating with hot 66° Baumé sulphuric acid. The sulphate may then be dissolved by the addition of hot water and the saturated solution siphoned for the separation therefrom of any insoluble material such as basic sulphate of thallium mixed with lead sulphate. The solution is then cooled whereby thallous sulphate will separate out as crystals which are recovered by decantation and washing.

The thallous sulphate crystals may then be dried for commercial use and the mother liquor evaporated and cooled for the further recovery of thallous sulphate, the residue being returned to the sponge tanks.

If desired, however, metallic thallium may be produced from the thallous sulphate crystals by dissolving the crystals in water and electrolyzing in an electrolytic cell using insoluble anodes and aluminum cathodes. The metallic thallium deposits on the cathodes as a loose, flaky, spongy metal, which is scraped off and pressed in a firm cake. The cake may then be melted and cast into thallium bars.

By means of the above described process, substantial quantities of thallium which would otherwise be lost as impurities in the cadmium sulphate solution may be recovered. By utilizing the cadmium sulphate solution prior to the separation of cadmium therefrom and after the removal of the various impurities, the thallium may be recovered in a comparatively pure state without going to the extra expense of removing the impurities separately from the thallium solution. The process may obviously be varied in accordance with the degree of purity required. Certain of the steps being omitted in case it is not necessary to remove the last traces of cadmium and any other elements which may be present.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of recovering thallium as purified thallous sulphate, which comprises forming a thallic sulphate solution substantially free from metallic impurities, such as copper, silver, bismuth, lead, mercury, arsenic and iron, treating the said thallic sulphate solution with a reducing agent whereby to form thallous sulphate, reacting the so-formed thallous sulphate solution with a soluble chromate to form a precipitate of thallous chromate, filtering said precipitate and washing with dilute sulphuric acid to remove residual cadmium values, reacting said washed precipitate with dilute sulphuric acid and a reducing agent to form thallous sulphate in solution, precipitating residual cadmium values by means of a sulfide treatment, and filtering off the solution of purified thallous sulphate.

2. The process of recovering thallium as purified thallous sulphate, which comprises forming a thallic sulphate solution substantially free from metallic impurities, such as copper, silver, bismuth, lead, mercury, arsenic and iron, treating the said thallic sulphate solution with a reducing agent whereby to form thallous sulphate, reacting the so-formed thallous sulphate solution with a soluble chromate to form a precipitate of thallous chromate, filtering said precipitate of thallous chromate, filtering said precipitate and washing with dilute sulphuric acid to remove residual cadmium values, reacting said washed precipitate with sulphur dioxide to form thallous sulphate in solution, precipitating residual cadmium values by means of a sulphide treatment, and filtering off the solution of purified thallous sulphate.

3. In the process of recovering thallium as the sulphate (ous), the steps of treating a thallic sulphate solution substantially free from metallic impurities, such as copper, silver, bismuth, lead, mercury, arsenic and iron, with a reducing agent to form a thallous sulphate solution, reacting the so-formed material with a soluble chromate to form insoluble thallous chromate, washing the precipitate with dilute acid to remove cadmium, redissolving the precipitate in sulphuric acid in the presence of a reducing agent and reacting the solution with an agent adapted to precipitate further amounts of cadmium.

4. In the process of recovering thallium as the sulphate (ous), the steps of treating a thallic sulphate solution substantially free from metallic impurities, such as copper, silver, bismuth, lead, mercury, arsenic and iron, with a reducing agent to form a thallous sulphate solution, reacting the so-formed material with a soluble chromate to form insoluble thallous chromate, washing the precipitate with dilute acid to remove cadmium, redissolving the precipitate in the presence of sulphur dioxide and reacting the solution with an agent adapted to precipitate further amounts of cadmium.

5. In the process of recovering thallium as the sulphate (ous), the steps of treating a thallic sulphate solution substantially free from metallic impurities, such as copper, silver, bismuth, lead, mercury, arsenic and iron, with a reducing agent to form a thallous sulphate solution, reacting the so-formed material with a soluble chromate to form insoluble thallous chromate, washing the precipitate with dilute acid to remove cadmium, redissolving the precipitate in the presence of sulphur dioxide and reacting the solution with a sulphide adapted to precipitate further amounts of cadmium as the sulphide.

6. The process of recovering thallous sulphate which comprises the steps of forming a thallic sulphate solution substantially free from metallic impurities, such as copper, silver, bismuth, lead, mercury, arsenic and iron, reacting the thallic sulphate with sodium bisulphite whereby to reduce the sulphate to the "ous" condition, reacting said thallous sulphate with a soluble chromate whereby to form thallous chromate, filtering said precipitated thallous chromate from the solution, treating the chromate precipitate with dilute sulphuric acid whereby to remove residual cadmium values as cadmium sulphate solution, and dissolving the precipitate in dilute acid under reducing conditions.

7. The process of recovering thallous sulphate which comprises the steps of forming a thallic sulphate solution substantially free from metallic impurities, such as copper, silver, bismuth, lead, mercury, arsenic and iron, reacting the thallic sulphate with sodium bisulphite whereby to reduce the sulphate to the "ous" condition, reacting said thallous sulphate with a soluble chromate whereby to form thallous chromate, filtering said precipitated thallous chromate from the solution, treating the chromate precipitate with dilute sulphuric acid whereby to remove residual cadmium values as cadmium sulphate solution, and dissolving the precipitate in a solution of sulphurous acid.

8. The process of recovering thallium as thallous sulphate which comprises the steps of forming a thallic sulphate solution substantially free from metallic impurities such as copper, silver, bismuth, lead, mercury, arsenic and iron, reacting the thallic sulphate with a reducing agent and sodium chromate in solution whereby to form thallous chromate, separating the thallous chromate from the solution, treating the chromate with dilute acid to form soluble cadmium compounds, and treating the residual thallous chromate with further quantities of sulphuric acid and a reducing agent whereby to form thallous sulphate.

9. The process of recovering thallium as thallous sulphate which comprises the steps of forming a thallic sulphate solution substantially free from metallic impurities such as copper, silver, bismuth, lead, mercury, arsenic and iron, reacting the thallic sulphate with a reducing agent and sodium chromate in solution whereby to form thallous chromate, separating the thallous chromate from the solution, treating the chromate with dilute acid to form soluble cadmium compounds, and treating the residual thallous chromate with a solution of sulphurous acid whereby to form thallous sulphate.

10. The process of recovering thallium as thallous sulphate which comprises the steps of forming a thallic sulphate solution substantially free from metallic impurities such as copper, silver, bismuth, lead, mercury, arsenic and iron, reacting the thallic sulphate with a reducing agent and sodium chromate in solution whereby to form thallous chromate, separating the thallous chromate from the solution, treating the chromate with dilute acid to form soluble cadmium compounds, and treating the residual thallous chromate with sulphur dioxide under conditions adapted to form thallous sulphate.

11. In the process of recovering thallium values, the steps comprising forming a thallic sulphate solution, substantially free from metallic impurities, such as copper, silver, bismuth, lead, mercury, arsenic and iron, reacting the thallic sulphate with a reducing agent to form the thallous compound, reacting the so-formed thallous compound with a soluble chromate whereby to form thallous chromate, filtering said thallous chromate from the solution and washing the precipitate with dilute acid whereby to remove cadmium values therefrom, and reacting the washed and purified thallous chromate with dilute sulphuric acid and sodium bisulphite whereby to form thallous sulphate.

12. In the process of recovering thallium values, the steps comprising forming a thallic sulphate solution, substantially free from metallic impurities, such as copper, silver, bismuth, lead, mercury, arsenic and iron, reacting the thallic sulphate with a reducing agent to form the thallous compound, reacting the so-formed thallous compound with a soluble chromate whereby to form thallous chromate, filtering said thallous chromate from the solution and washing the precipitate with dilute acid whereby to remove cadmium values therefrom, and reacting the washed and purified thallous chromate with nascent sulphur dioxide whereby to form thallous sulphate.

13. In the process of recovering thallium values, the steps including forming a thallic sulphate solution substantially free from metallic impurities such as copper, silver, bismuth, lead, mercury, arsenic and iron, reacting the thallic sulphate with a reducing agent and a soluble chromate to form thallous chromate, filtering the precipitated chromate from the solution and removing cadmium by washing the said precipitate with dilute sulphuric acid, and reacting the residual thallous chromate with further quantities of sulphuric acid and a reducing agent to form thallous sulphate.

14. The process of recovering thallium which comprises forming a thallic sulphate solution substantially free from metallic impurities such as copper, silver, bismuth, lead, mercury, arsenic and iron, reducing the thallic sulphate solution to the "ous" condition by means of a reducing agent and adding a soluble chromate to form thallous chromate, removing the precipitated thallous chromate from a solution by filtration, treating the precipitate with dilute sulphuric acid, to remove cadmium values, reacting the purified chromate with sulphuric acid and a reducing agent to form thallous sulphate, and treating with hydrogen sulphide to remove further quantities of cadmium as the precipitated sulphide.

15. The process of recovering thallium which comprises forming a thallic sulphate solution substantially free from metallic impurities such as copper, silver, bismuth, lead, mercury, arsenic and iron, reducing the thallic sulphate solution to the "ous" condition by means of a reducing agent and adding a soluble chromate to form thallous chromate, removing the precipitated thallous chromate from a solution by filtration, treating the precipitate with dilute sulphuric acid, to remove cadmium values, reacting the purified chromate with sulphuric acid and a reducing agent to form thallous sulphate, and treating with a sulphide to remove further quantities of cadmium as the precipitated sulphide.

16. The process of recovering thallium which comprises forming a thallic sulphate solution substantially free from metallic impurities such as copper, silver, bismuth, lead, mercury, arsenic and iron, including the steps of reducing the thallic sulphate to the thallous condition, forming thallous chromate therefrom by the action of a soluble chromate, separating said precipitated thallous chromate from the solution, washing the precipitate in dilute sulphuric acid whereby to remove cadmium values, reacting the washed precipitate with sulphuric acid and sodium bisulphite whereby to form thallous sulphate, and precipitating further quantities of cadmium by hydrogen sulphide.

17. The step in the process of recovering thallium values which consists in reacting a thalliferous solution with sodium bisulphite.

18. In the process of recovering thallium values, the step which comprises forming thallous sulphate from a thallous salt by reacting nascent sulfur dioxide therewith.

19. In the process of recovering thallium values the step which comprises forming thallous sulphate from thallous chromate by reacting nascent sulfur dioxide therewith.

20. The step in the process of recovering thallium values which consists in reacting a thalliferous solution with sulphur dioxide.

21. The step in the process of recovering thallium values which consists in reacting a thalliferous solution with sulphurous acid.

In testimony whereof we have hereunto set our hands.

STANLEY HUGHES.
ROSCOE TEATS.